United States Patent [19]

Yuda

[11] 4,085,623

[45] Apr. 25, 1978

[54] DEVICE FOR ADJUSTING LENGTH OF ROD

[75] Inventor: Takuo Yuda, Yokohama, Japan

[73] Assignee: NIFCO Inc., Tokyo, Japan

[21] Appl. No.: 677,658

[22] Filed: Apr. 16, 1976

[30] Foreign Application Priority Data

Apr. 18, 1975 Japan .............................. 50-51950[U]

[51] Int. Cl.² .......................................... F16H 27/02
[52] U.S. Cl. ..................................... 74/89.15; 403/46
[58] Field of Search ........................... 74/89.15, 141.5; 403/46

[56] References Cited

U.S. PATENT DOCUMENTS

| | | | |
|---|---|---|---|
| 1,683,516 | 9/1928 | Adams | 403/46 |
| 2,694,586 | 11/1954 | Smith | 403/46 |
| 3,551,931 | 1/1971 | Monroe et al. | 74/89.15 |
| 3,838,603 | 10/1974 | Schwartzman | 74/89.15 |

FOREIGN PATENT DOCUMENTS

6,907 of 1902 United Kingdom .................... 403/46

*Primary Examiner*—Benjamin W. Wyche
*Assistant Examiner*—Wesley S. Ratliff, Jr.
*Attorney, Agent, or Firm*—Jack R. Halvarsen; Robert W. Beart

[57] ABSTRACT

Disclosed is a device for adjusting the length of a rod, which comprises in combination a cylindrical body provided with an internally embedded nut for allowing the external male screw formed on the peripheral surface of a rod to be driven therethrough and adapted to be freely moved in the direction of the length of the rod by the rotation thereof around its axis, a pair of freely swingable pawls disposed in an opposed relationship and extended via constrictions serving as hinges therefor from the upper edge of the cavity of said cylindrical body, an annular operating member encircling the upper edge of the cavity of said cylindrical body and having the outer ends of said pawls connected thereto, whereby a vertical movement imparted to said annular operating member causes the inner free ends of said pawls to plunge into or emerge from said cavity and consequently come into or out of engagement with a flattened portion formed above said male screw on said rod and enable the movement of said cylindrical body to be freely adjusted relative to the direction of the length of said rod.

6 Claims, 4 Drawing Figures

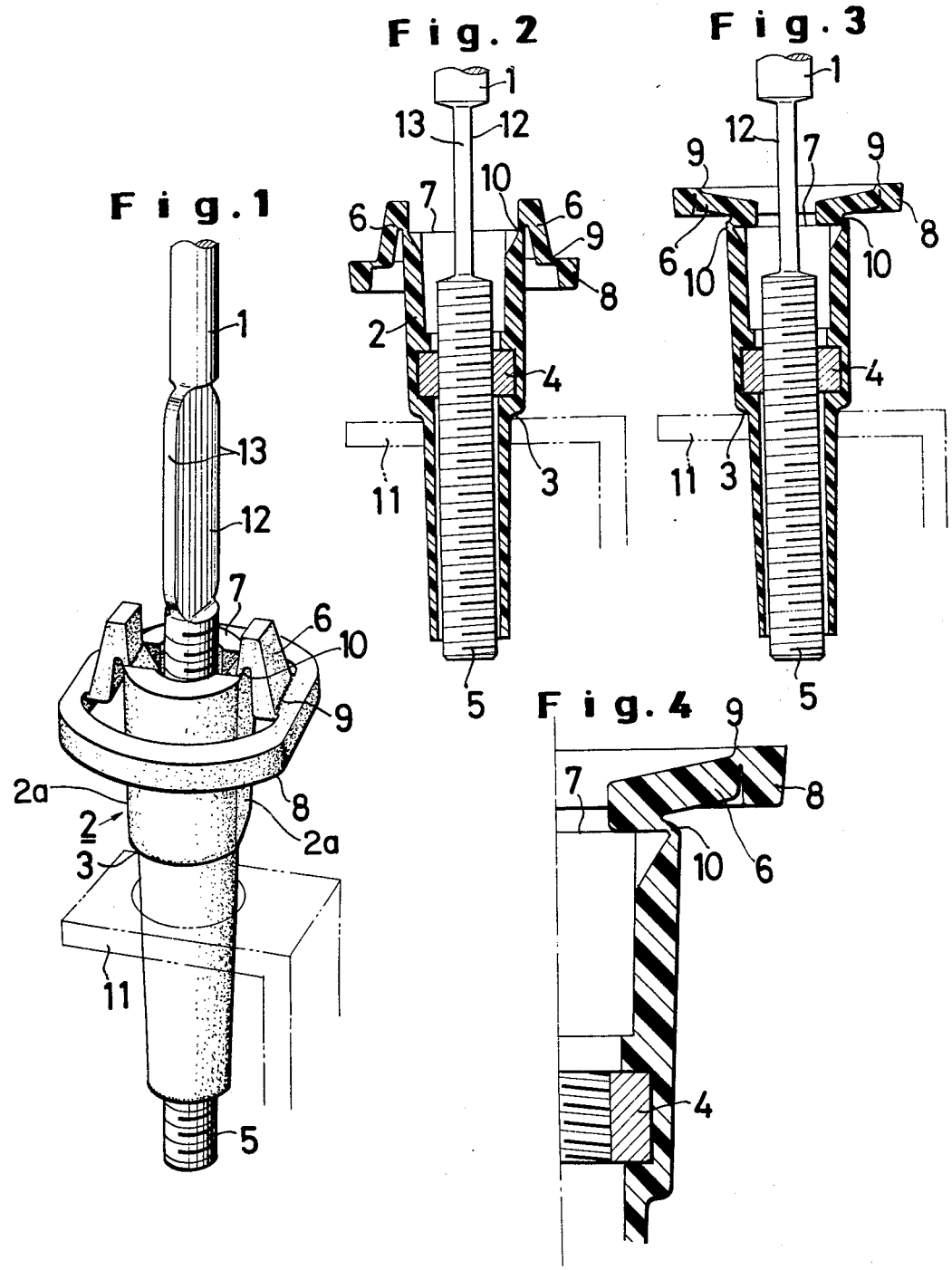

DEVICE FOR ADJUSTING LENGTH OF ROD

BACKGROUND OF THE INVENTION

This invention relates to a device for adjusting the length of a rod. More particularly, the present invention relates to a device for adjusting the length of a rod of the type used for transmission of motion as when the motion of one member is to be transmitted to another member.

When the lock mechanism such as in an automobile door is actuated by the operation of a release lever, for example, a rod is generally used as an intermediary element for conveying the motion. When automobile doors are manufactured on a mass-production basis, however, there is encountered a problem that the distance between the release lever and the lock mechanism is not necessarily constant among the individual doors. The manufactural error which occurs between said two mechanical members, therefore, must be coped with by the measure of adjusting the length of individual rods while the members are being joined in the assembly line.

The device heretofore used for the adjustment of the length of a rod comprises two major parts, viz. a cylindrical body which has a nut embedded in the interior thereof and a plurality of raised strips formed in the longituidnal direction on the peripheral surface thereof and a rotation arrester which has an opening formed at the center thereof for passage of the flattened portion of a rod and pawls formed on the outer edge thereof in such way that, when bent, they come into engagement with the raised strips on the peripheral surface of said cylindrical body. With this device, the required adjustment of the length of a rod is effected by inserting the rotation arrester around the flattened portion of the rod in advance, then inserting the rod into the cylinder body, adjusting the length of the rod to suit the occasion by rotating the cylindrical body and pushing the pawls of the rotation arrester into tight, frozen engagement with the raised strips on the peripheral surface of the cylindrical body.

The device which effects the adjustment of the length of a rod by the operating principle just mentioned, however, consists of two parts and therefore proves to be expensive and entails a difficult work of assembly.

An intermediate object of the present invention is to provide a device formed of a plastic material in a unitary structure such that the length of the rod can freely be adjusted and the rod thus adjusted to the desired length can then be immobilized by a simple operation.

SUMMARY OF THE INVENTION

To accomplish the object describe above according to the present invention, there is provided a device for adjusting the length of a rod, which comprises a cylindrical body having a nut embedded therein for allowing the male screw formed on the peripheral surface of a rod to be driven therethrough, an annular operating member encircling the upper edge of the cavity of said cylindrical body, and a pair of freely swingable pawls disposed opposite each other across the opening in the upper edge of said cavity and each connected, on one end, to the upper edge of the cavity of said cylindrical body via a constriction formed to serve as a hinge therefor and, on the other end, to the inner edge of said annular operating member via a constriction also serving as a hinge therefor. An upward push given to said annular operating member causes the inner free ends of the pawls to thrust out into the upper edge of the cavity of the cylindrical body, come into tight engagement with the flattened portion formed in said rod above the male screw and bring the rotation of the cylindrical body to a stop. A downward push imparted to the annular operating member causes the inner free ends of the pawls to diverge and consequently come out of engagement with said flattened portion of the rod, with the result that the cylindrical body is allowed to rotate around its axis and effect a desired adjustment of the length of rod. Since the device of the present invention for the adjustment of the length of rod consists of a unitary structure as described above, it can easily be fabricated integrally of a plastic material and permits the length of the rod to be freely adjusted by a simple operation.

The other objects and the other characteristic features of the present invention will become apparent from the description to be given in detail herein below with reference to the accompanying drawing.

BRIEF EXPLANATION OF THE DRAWING

FIG. 1 is a perspective view of one preferred embodiment of the device for adjusting the length of rod according to the present invention.

FIG. 2 is a cross section illustrating the device of FIG. 1, with the pawls held in their diverged state.

FIG. 3 is a cross section illustrating the device of FIG. 1, with the pawls held in their converged state.

FIG. 4 is an enlarged cross section illustrating the essential part of FIG. 3.

DESCRIPTION OF THE PREFERRED EMBODIMENT

The drawing depicts a typical operation wherein the adjustment of the length is given to the motion-conveying rod serving to connect the release lever with the actuating piece of door-locking mechanism in an automobile door. The rod 1 is connected, at the upper end thereof, with the release lever (not illustrated) and, at the lower end thereof, with the actuating piece 11 of the locking mechanism through the medium of the adjusting device 2 formed of a plastic material such as, for example, nylon in a cylindrical form in accordance with the present invention (hereinafter referred to briefly as "cylindrical body"). Said cylindrical body 2 has its outer diameter decreased more or less from the upper to the lower end, with a downward step 3 formed at a point in the length thereof. In the upper section of the cylindrical body wherein the outside diameter is greater, the inside diameter (the diameter of the cavity formed therein) is proportionally greater than in the lower section. At the lower end of the upper cavity of the cylindrical body, namely along the boundary separating the upper cavity from the lower cavity of the smaller diameter, there is embedded a nut 4. A male screw 5 which is formed in the lower section of said rod is driven in through this nut, whereby the cylindrical body is set in engagement with the rod and, through its rotation around its axis, can freely be moved in the direction of the length of said rod. As regards the manner of incorporation of said nut in the device, the nut is insert molded in position while the cylindrical body 2 is being injection molded, so that the nut and the cylindrical body are joined integrally fast enough to prevent separation.

In the figures, the numeral 6 denotes pawls which are disposed opposite each other on the upper edge 7 of the cavity of said cylindrical body and fall in a common plane lying on the axis of the cylindrical body, while the numeral 8 denotes an annular operating member for operating said pawls.

The pawls 6 are integrally connected through the medium of constrictions 10 serving as hinges on the edge 7 of the cavity of the cylindrical body and are adapted to have their inner and outer ends rendered freely swingable at these hinges as the fulcra. The outer free ends of pawls 6, which protrude outwardly from the cylindrical body, are connected via constrictions 9 serving as hinges to the inner edge of said annular operating member 8. The pawls 6 thus interposed between the operating member and the cylindrical body, serve the purpose of holding said operating member 8 outside the upper edge of the cavity of said cylindrical body.

Further, the pawls 6 are so formed that the length from the hinges 10 joined to the upper edge of the cavity of the cylindrical body to the corresponding hinges 9 joined to the inner edge of the annular operating member 8 is slightly greater than the distance between the upper edge 7 of the cavity of said cylindrical body and the operating member, namely the gap intervening between them. Normally, therefore, said operating member is positioned either above or below the plane lying on the upper edge 7 of the cavity as illustrated in FIGS. 2 and 3 while the outer hinges 9 do not coincide with the radiant lines passing the inner hinges 10 (namely the line perpendicularly intersecting the axial line of the cylindrical body). In consequence of said positioning of the operating member, the pawls 6 are turned downwardly or upwardly respectively. This structure of the device permits choice between the two postures of the pawls; one posture in which the inner free ends thereof are diverged and caused to protrude upwardly from the upper edge 7 of the cavity (FIG. 2) and the other posture in which said inner free ends thereof are converged and caused to thrust below the upper edge 7 into the cavity (FIG. 3). Said operating member is moved upwardly or downwardly to shift the pawls from one posture to the other as an upward push or downward push is given thereto by the tip of the finger. In this case, since the distance between the hinges 10 and the hinges 9 of the pawls is greater than the gap intervening between the operating member and the cylindrical body, the outer hinges 9 while in the process of passing said radiant lines, bend outwardly in themselves owing to the elasticity of the material of which they are made and at the same time force the hinges at the upper edge 7 of the cavity to bend inwardly in themselves. The combined amount of their bend permits the outer hinges to turn past the radiant lines with an over-centering snap action. Once they have passed the radiant lines, the operating member and the upper edge of the cavity resume their original positions and consequently inhibit the operating member 8 from free vertical movement and cause the pawls 6 to slant in the directions in which the operating members are positioned and assume either the diverged or the converged posture.

The device for adjustment of the present invention possessed of the structure described above is put into its working position by causing the nut disposed in the interior of the cylindrical body to be rotated along the male screw 5 formed on the rod, the rotation being accomplished manually by the operator's fingers or by engagement of a suitable tool, not shown, with the flats 2a located in opposition on the body 2. This rotation of this nut and consquently the entire device around said male screw permits the device to move in the direction of the length of the rod. When the other end of the rod is connected with the release lever, not shown, and the periphery of the cylindrical body is engaged as illustrated with the actuating piece 11 of the locking mechanism, therefore, said rotary movement of the cylindrical body relative to the rod permits the distance between the release lever, not shown, and the actuating piece 11 to be adjusted freely until step or shoulder 3 engages piece 11. After the cylindrical body has been moved to a required position, the operating member 8 is pushed up by the operator's finger tip until the inner free ends of the pawls 6 thrust past the upper edge 7 into the cavity and come into juxtaposition with the flattened portion 12 formed on the rod above the male screw. Consequently, the inner free ends of pawls 6, when the operator is in the up position, have a predetermined spacing less than the edge-to-edge measurement of the flattened portion 12 and come into fast engagement with the swelled edges 13 of said flattened portion 12 and inhibit the cylindrical body from further rotation around its axis, with the result that the cylindrical body is immobilized at that position. Of course, the cylindrical is again permitted to make the rotation around its axis when the operating member is pushed down to the extend of causing the pawls to release themselves from said fast engagement and resume their initial diverged posture. Thus, the adjustment of the position of the cylindrical body relative to the rod can be effected once again.

As described above, the device for adjusting the length of rod according to the present invention permits the length of a rod to be freely adjusted by the rotation of the cylindrical member around its axis and consequently enables the rod to be immobilized at a desired position. Moreover, the immobilization can easily be effected by the vertical movement of the operating member. The device, accordingly, proves to be highly convenient. Further, since the device for adjusting the length of rod according to this invention has the cylindrical body, pawls and operating member molded of a plastic material in a unitary structure and consequently has the operating member disposed in direct contact with the cylindrical body, the cylindrical body can be fixed at a desired position and the positional relation between the operating member and the cylindrical body is fixed even in a limited space, enabling the desired setting and resetting of the rod relative to the device to be effected simply by pushing up or down the operating member. In addition to the preferred embodiment so far described, the device of the present invention can be used for other systems which require adjustment of the length of a rod.

What is claimed is:

1. A one-piece plastic device adapted for adjustment of a rod having a screw threaded free end portion and a flattened portion adjacent thereto, said device including a substantially cylindrical open-ended body portion, female threaded means positioned internally and intermediate the extremities of said body and adapted to cooperate with said threaded portion of said rod, enlarged cavity means positioned and extending between said female threaded means and one end of said body, locking means including a pair of freely swingable pawls disposed opposite each other at the open cavity end of said body with each said pawl being integrally connected adjacent one end to the free end edge of said body by a flexible hinge and each said pawl being connected by a flexible hinge at their opposite end to the inner edge of an annular operating member, said member encircling said body in spaced relation adjacent the cavity end of said body, said pawls initially being disposed in an open unobstructing position relative to said open cavity end while axial movement of said operating member in the direction of said open end causes the said one end of said pawls to swing radially inwardly over the free end edge of said body to thereby restrict movement of said rod relative to said body by engaging the flattened portion of said rod and preventing rotation of the body relative to the rod and positioning means located on the exterior of intermediate the extremities of said body.

2. The device for adjusting the length of a rod according to claim 1, wherein the outside diameter of the cylindrical body is gradually decreased in the direction from said enlarged cavity end of said body toward the opposite end.

3. A device of the type claimed in claim 1 wherein said female theaded means includes a nut complimentary to the threaded portion of said rod and which is insert molded in said body and restrained thereby against rotation relative to said body.

4. A device of the type claimed in claim 1 wherein said cylindrical body includes two sections having differing diameters, a first section having an internal diameter slightly larger than said threaded portion of the rod and a second section substantially greater than said first section and forming said enlarged cavity adapted to freely accept rotation of said flattened portion of the rod in co-axial relation thereto, shoulder means interconnecting said first and second sections of said body to form said positioning means, said female threaded means being located axially adjacent said shoulder means.

5. A device of the type claimed in claim 4 wherein said female theaded means includes a nut complimentary to said threaded portion of the rod, said nut being insert molded in said second section of the body adjacent its juncture with said first section.

6. A device of the type claimed in claim 1 wherein the distance between the hinges at opposite ends of the pawls is greater than the gap between said annular rings and said cavity end of said body the hinges must elastically distort to permit the operating ring and pawls to move relative to said body thereby creating an over-center snap feel to the movement of said operating ring and lockingly positioning said pawls in one of two positions.

* * * * *